United States Patent [19]

Isaji et al.

[11] Patent Number: 5,607,185
[45] Date of Patent: Mar. 4, 1997

[54] BELT TIGHTENER FOR SEAT BELT

[75] Inventors: Kazuyoshi Isaji; Shinichi Iwai, both of Kariya; Yutaka Ohashi, Handa, all of Japan

[73] Assignee: Nippondenso Co., Ltd., Kariya, Japan

[21] Appl. No.: 345,816

[22] Filed: Nov. 22, 1994

[30] Foreign Application Priority Data

| Nov. 26, 1993 | [JP] | Japan | 5-321195 |
|---|---|---|---|
| Nov. 26, 1993 | [JP] | Japan | 5-321196 |
| Nov. 26, 1993 | [JP] | Japan | 5-321197 |
| Jan. 6, 1994 | [JP] | Japan | 6-011388 |
| Jan. 7, 1994 | [JP] | Japan | 6-012109 |
| Jan. 7, 1994 | [JP] | Japan | 6-012110 |

[51] Int. Cl.⁶ .................................... B60R 22/36
[52] U.S. Cl. ........................... 280/806; 297/480
[58] Field of Search ................. 280/806, 801.1; 297/480

[56] References Cited

U.S. PATENT DOCUMENTS

| 4,427,216 | 1/1984 | Kato et al. | 280/806 |
|---|---|---|---|
| 4,705,296 | 11/1987 | Andersson et al. | 280/806 |
| 4,913,497 | 4/1990 | Knabel et al. | 280/806 |
| 5,129,679 | 7/1992 | Specht et al. | 280/806 |
| 5,169,173 | 12/1992 | Nishizawa | 280/806 |
| 5,181,738 | 1/1993 | Shimizu | 280/801.1 |
| 5,181,773 | 1/1993 | Colvin | 280/801.1 X |
| 5,207,618 | 5/1993 | Nishizawa | 474/101 |
| 5,271,639 | 12/1993 | Nishizawa | 280/806 |
| 5,288,105 | 2/1994 | Ikegaya et al. | 297/480 X |
| 5,377,554 | 1/1995 | Reulein et al. | 280/806 X |
| 5,405,180 | 4/1995 | Föhl | 297/478 |

FOREIGN PATENT DOCUMENTS

| 502370 | 9/1992 | European Pat. Off. . |
|---|---|---|
| 525837 | 2/1993 | European Pat. Off. . |
| 4032829 | 5/1991 | Germany . |
| 9108781 | 1/1992 | Germany . |
| 4027357 | 3/1992 | Germany . |
| 4137211 | 5/1992 | Germany . |
| 61-241234 | 10/1986 | Japan . |
| 63-22752 | 1/1988 | Japan . |
| 4-63746 | 2/1992 | Japan . |
| 5-42013 | 6/1993 | Japan . |

*Primary Examiner*—Christopher P. Ellis
*Attorney, Agent, or Firm*—Cushman, Darby & Cushman IP Group of Pillsbury Madison & Sutro LLP

[57] ABSTRACT

A pre-loader device that quickly tighten a seat belt after a sudden deceleration of a vehicle is detected is disclosed herein. The pre-loader device includes a mass body and a casing housing the mass body with the mass body being movable in the longitudinal direction of the vehicle within the casing. A holder is positioned by a weak coil spring, and a strong coil spring is disposed between a flange part of the mass body and a flange part of the holder. A retainer and the holder hold therebetween stoppers disposed at the tip of plate springs that extend from the rear end of the mass body so as to position the mass body and maintaining the coil spring in a compressed state. A wire connects the rear end of the mass body to a seat belt buckle.

10 Claims, 16 Drawing Sheets

BELT TIGHTENER FOR SEAT BELT

CROSS REFERENCE TO RELATED APPLICATIONS

This application is based upon and claims priority from Japanese Patent Application No. 5-321195, filed Nov. 26, 1993; Japanese Patent Application No. 5-321196, filed Nov. 26, 1993; Japanese Patent Application No. 5-321197, filed Nov. 26, 1993; Japanese Patent Application No. 6-11388, filed Jan. 6, 1994; Japanese Patent Application No. 6-12109, filed Jan. 7, 1994; and Japanese Patent Application No. 6-12110, filed Jan. 7, 1994, with the contents of each document being incorporated herein by reference.

BACKGROUND OF THE INVENTION

1. Field of the Invention

The present invention generally relates to a belt tightener for a seat belt for use with passengers in moving vehicles, such as cars, trucks, roller coasters, etc. More particularly, the present invention relates to a belt tightener for tightening a seat belt when the vehicle is subject to sudden deceleration.

2. Related Art

A pre-loader device is designed to quickly tighten a seat belt to eliminate any slack therein and protect the passenger in conjunction with the locking of the retractor. To enable the seat belt to be tightened in a short time, conventional devices have been proposed that cause the seat belt buckle to move using spring force of a torsion bar or a coil spring. Such a tightening device is disclosed in, e.g., Japanese Unexamined Patent Publication Nos. 4-63746 and 61-241234. Another proposal for tightening a seat belt has been to reel a seat belt using the explosive power of powder, for example. Such a device is disclosed in, e.g., Japanese Unexamined Patent No. 63-22752.

Each of the above conventional seat belt buckles is provided with a locking mechanism for locking the tongue plate of the seat belt and a release button for releasing the locking operation of the locking mechanism in order to make the seat belt detachable. However, these systems have the problem that, after the seat belt buckle is pulled in by the pre-loader during a sudden stop of the vehicle, for example, as the seat buckle has been displaced, the release button can not be quickly operated when the passenger attempts to leave the vehicle. Such a problem poses problems in the event of motor vehicle accidents.

It is desirable that the pre-loader device should be actuated to protect the passenger not only when the vehicle collides but also when the vehicle is running on a rough road, for example. However, conventional devices have been designed taking only collisions into consideration, and therefore, the whole device has to be replaced after the device is actuated a single time.

It is desirable that a pre-loader device complete the tightening of the seat belt in a short time from when sudden deceleration of the vehicle is detected to when the body load of the passenger is applied to the seat belt. However, conventional pre-loader devices are not yet actuated in a sufficiently short enough time.

SUMMARY OF THE INVENTION

It is thus an object of the present invention to solve the problem noted above by providing a seat belt buckle with which a seat belt can quickly be detached even after the pull-in movement of the pre-loader device.

It is another object of the present invention to solve the above problem by providing a pre-loader device for a seat belt which can be used repeatedly and be actuated easily as needed according to the vehicular operating conditions other than in the event of an accident.

It is still another object of the present invention to provide a pre-loader device that is free from accidental actuation, which might occur during inspection, for example.

It is a further object of the present invention to solve the problem found in conventional devices by providing a pre-loader device for a seat belt that can be used repeatedly, can be easily actuated as needed according to the vehicular operating conditions, and can be made inoperable if an excessively large load from a passenger is applied to the seat belt, which would allow elongation of the seat belt.

It is still a further object of the present invention to provide a pre-loader device for a seat belt which can quickly tighten the seat belt after a sudden deceleration of the vehicle is detected.

These and other objects of the present invention are achieved by a structure for tightening a seat belt disposed in a vehicle and thereby holding passengers securely therein that includes a casing having first and second hollow parts. The tightener includes a supporting means disposed in the first hollow part for moving in a longitudinal direction of the casing in response to a deceleration force of the moving vehicle. Furthermore, the tightener has means for supplying a force in a direction opposite to a direction of the deceleration force. The supplying means is connected to the seat belt, is disposed in the first hollow part and includes a blocking means for blocking the supplying means in order to prevent the supplying means from supplying the force until the supporting means moves in the longitudinal direction by a predetermined distance which releases the supplying means.

BRIEF DESCRIPTION OF THE DRAWING

Other objects, features and characteristics, as well as the function of related parts, of the present invention will be appreciated by a person of ordinary skill in the art by a study of the following detailed description, the appended claims and drawings, all of which form a part of this application. In the drawings:

DETAILED DESCRIPTION OF THE PRESENTLY PREFERRED EXEMPLARY EMBODIMENTS

Figure 1:
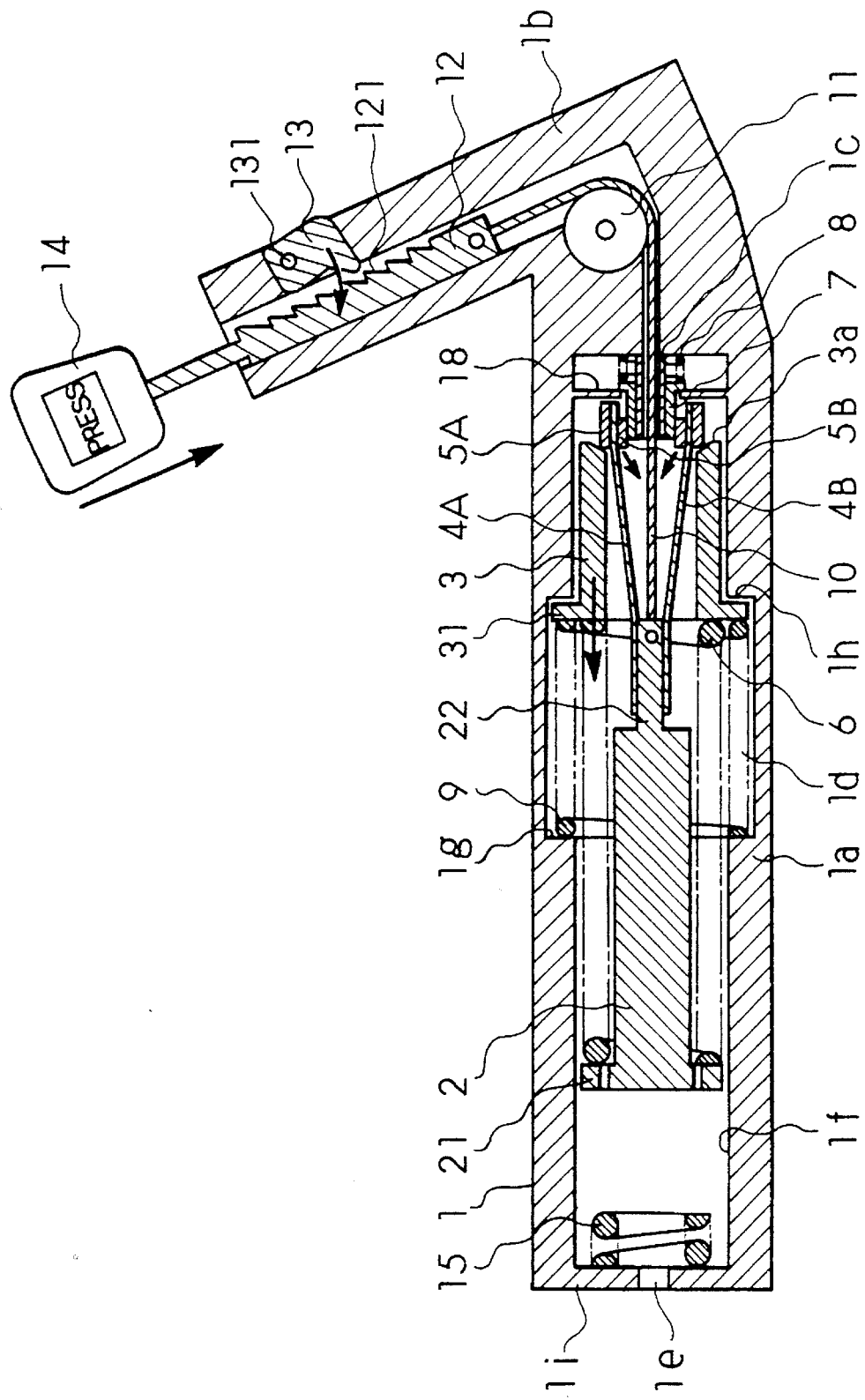
FIG. 1 is an overall longitudinal cross-sectional view illustrating a pre-loader device according to an embodiment of the present invention.

In FIG. 1, casing 1 includes horizontal part 1a disposed in the longitudinal direction of a vehicle (sideways in the figure) and inclined part 1b diagonally extending upwards from one end of horizontal part 1a. Within the cylindrical space defined by horizontal part 1a is disposed metal mass body 2 that includes a holding member, a holding release member and a pull-in member. At the front end of mass body 2 is formed flange 21. The outer periphery of flange 21 is disposed proximate to inner peripheral wall if of horizontal part 1a.

At the rear end of the inner space defined by horizontal part 1a of casing 1, cylindrical holder 3 is disposed that includes a supporting member with its outer periphery being proximate to inner peripheral wall 1f. Flange part 31 of holder 3 formed at the front end thereof is positioned within recessed part 1d annularly formed in an intermediate position in inner peripheral wall 1f of horizontal part 1a. Within recessed part 1d, coil spring 9 is disposed. Coil spring 9 has a weak spring force between flange part 31 and front end wall 1g of recessed part 1d. Cylindrical holder 3 is pressed backwards by the coil spring 9 and held in the position illustrated in FIG. 1 with flange part 31 being in contact with rear end wall 1h of recessed part 1d.

Flat connecting part 22 protrudes from the rear end of mass body 2. The upper and lower faces of flat connecting part 22 are fixed with the base ends of plate springs 4A and 4B respectively. Plate springs 4A and 4B are inclined upwards and downwards, respectively, so that the gap therebetween becomes gradually wider towards the rear tip ends thereof. The tip ends of both plate springs 4A and 4B are bent to be horizontal and are fixed with inside stoppers 5B and outside stoppers 5A on the upper and lower faces thereof respectively. A locking part includes stoppers 5A and 5B, which hold plate springs 4A and 4B.

On the rear end wall (not numbered) of the inner space defined by horizontal part 1a, guide projection 1c is formed in the center of the wall. Retainer 7 fits over guide projection 1c. Retainer 7 is pressed forwards by coil spring 8 disposed at the back thereof. The flange part of retainer 7 contacts stopper plate 18 protruding from inner peripheral wall 1f of horizontal part 1a. Retainer 7 includes a regulating member.

As illustrated in FIG. 1, inside stoppers 5B contact the outer periphery of retainer 7, while outside stoppers 5A are in contact with rear end face 3a of holder 3. In this way, inside stoppers 5B and outside stoppers 5A are held between retainer 7 and holder 3.

Between flange 21 of mass body 2 and flange part 31 of holder 3, coil spring 6 having a strong spring force in the compressed state is disposed. As outside stoppers 5A and inside stoppers 5B are held between holder 3 and retainer 7, respectively, mass body 2 is held in the position shown in FIG. 1 in resistance to the expanding spring force of coil spring 6. Here, as outside stoppers 5A and inside stoppers 5B are held by rear end face 3a of holder 3 and the outer periphery of retainer 7, stoppers 5A and 5B can be maintained in a firmly held state even under a strong spring force of coil spring 6.

In front end wall 1i of the casing 1, a breathing hole 1e for communicating the inner space defined by horizontal part 1a with the outside air is formed. On front end wall 1i, cushioning coil spring 15 is provided, extending towards the inner space.

An end of wire 10 is connected to connecting part 22 of the mass body 2. Wire 10 is threaded through a through hole formed in the center of guide projection 1c and looped over pulley 11 disposed at the base end of inclined part 1b of casing 1. Then, wire 10 further extends upwards in the cylindrical space defined within inclined part 1b, and is connected to the lower end of a non-return rod 12.

Non-return rod 12 is longitudinally movably fitted within the inner space of inclined part 1b. On a side face of non-return rod 12, a plurality of sawtooth-like rachet teeth 121 are formed, while at the upper end of non-return rod 12, a seat belt buckle 14 is fixed. An opening is formed in the side wall of inclined part 1b facing ratchet teeth 121. Locking pawl 13 is provided in the opening to prevent regression of the non-return rod 12, and the upper end part of pawl 13 is pivotally supported by a pin 131. In a state where no inertial force towards the front of the vehicle is present, locking pawl 13 is positioned in the opening separated from non-return rod 12 as illustrated in FIG. 1.

In the pre-loader device having the above structure, when the deceleration of the vehicle increases due to sudden stoppage, for example, locking pawl 13 sways in the direction indicated by the arrow FIG. 1 and contacts one of ratchet teeth 121 of non-return rod 12 due to inertial forces at a stage when the deceleration is still very small.

Figure 2:
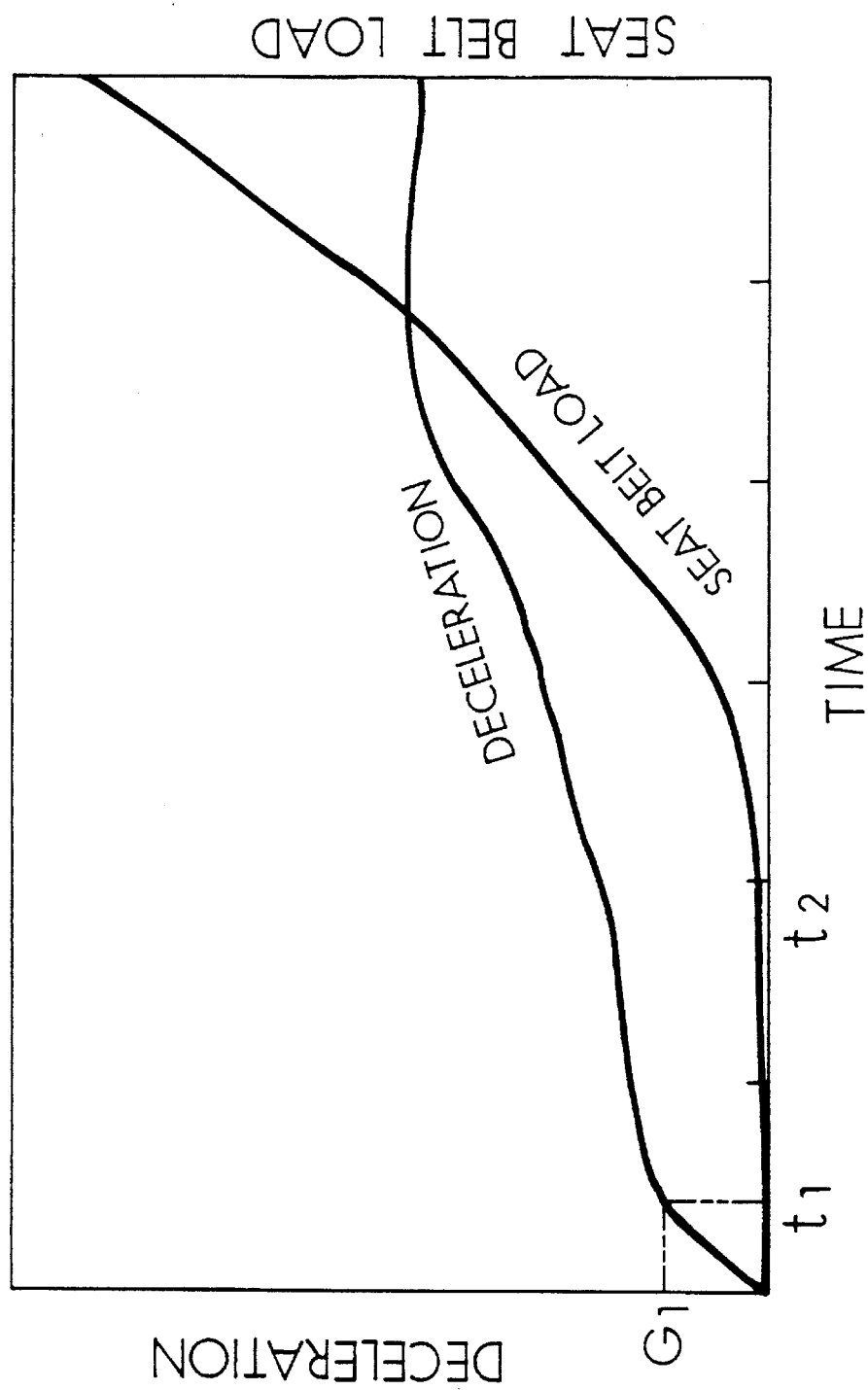
FIG. 2 is a time chart illustrating the operation of the pre-loader device.

When the deceleration starts increasing, as the spring force of coil spring 9 is weak, the inertial force acting on mass body 2 and holder 3 exceeds the spring force of coil spring 9 at time t1 in FIG. 2 at an early stage of deceleration when the value of deceleration exceeds G1, and coil spring 9 is compressed and deformed, whereby mass body 2 and holder 3 start advancing. Following this movement, rear end 3a of holder 3 separates from the tip end of retainer 7, the gap therebetween becomes wider, and inside stoppers 5B separate from the outer periphery of retainer 7.

As a result, outside stoppers 5A can move inwards as indicated by the arrow in FIG. 1 along the tapered face of the rear end of holder 3. As the strong expanding spring force of coil spring 6 is acting on outside stoppers 5A through mass body 2, outside stoppers 5A penetrate in the inner space of cylindrical holder 3 in resistance to the spring force of plate springs 4A and 4B. As a result of the release of the firmly held state of outside stoppers 5A and inside stoppers 5B, mass body 2 is quickly pushed forwards by the expansion of coil spring 6.

By the advance of mass body 2, wire 10 is pulled and non-return rod 12 and seat belt buckle 14 are integrally pulled downwards. By the pull of seat belt buckle 14, a seat belt connected thereto with a tongue plate (not illustrated) is pulled and slack in the seat belt is eliminated.

As mass body 2 is quickly moved by the spring force of coil spring 6, the slackness in the seat belt is quickly and completely eliminated by the time the passenger under deceleration is moved forwards, thus applying a load corresponding to the passenger to the seat belt. Therefore, although the spring force of coil spring 6 is relatively small, the slack in the seat belt can completely be eliminated.

Non-return rod 12 with ratchet teeth 121 moves downwards, sliding past locking pawl 13. However, when the load of the passenger is applied to the seat belt, locking pawl 13 catches the vertical face of one of the ratchet teeth 121 to prevent non-return rod 12 from moving up for regression. Accordingly, the body of the passenger can be protected from forward ejection from the seal belt, as the slackness therein has been eliminated. Here, the connecting member collectively or individually refers to connecting part 22, wire 10, non-return rod 12 and seat belt buckle 14.

Next, the second embodiment will be described. The same numerals as those of the first embodiment will be allocated to the components common to those of the first embodiment respectively and description thereof will be omitted.

Figure 3:
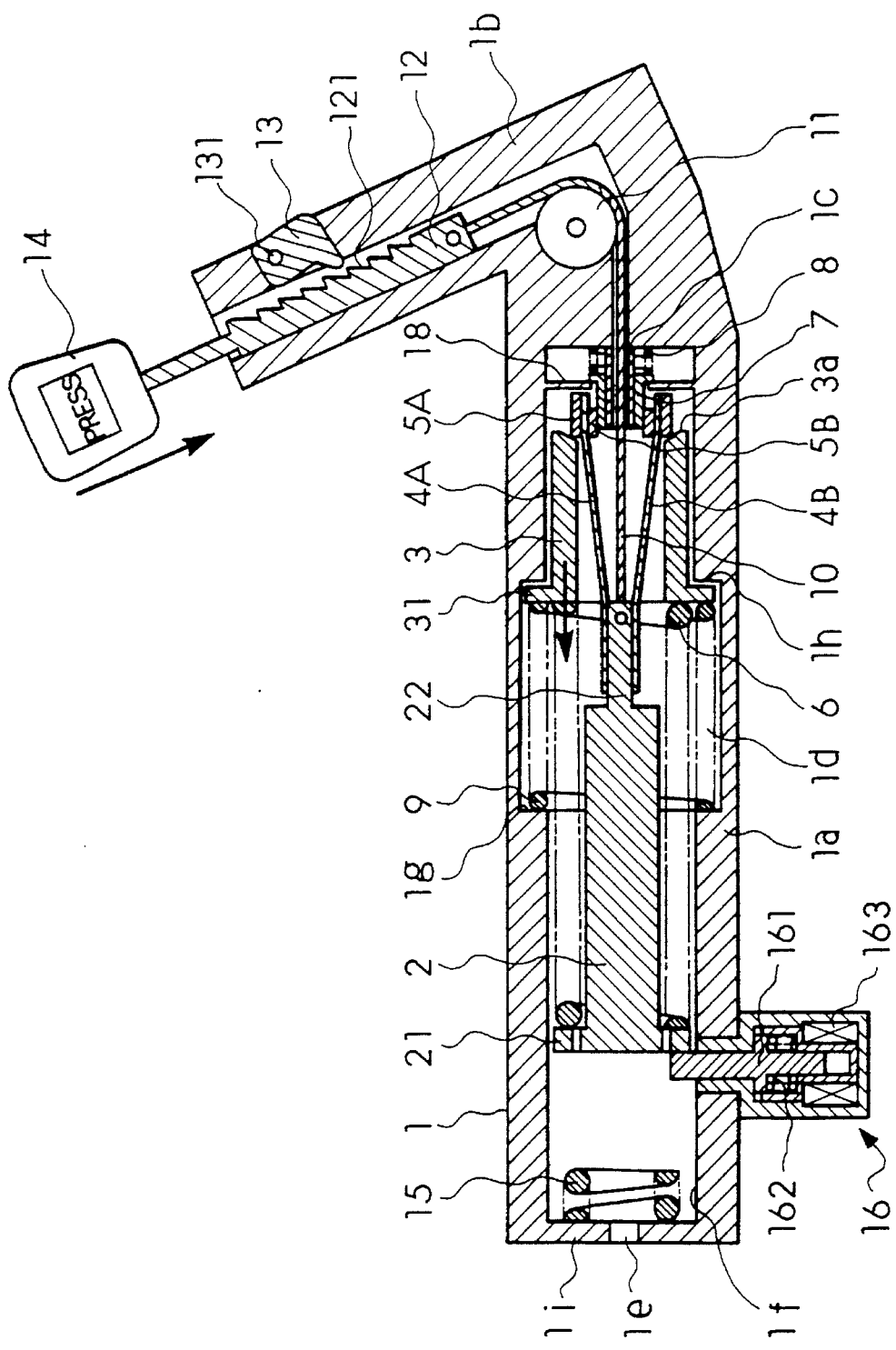
FIG. 3 is an overall longitudinal cross-sectional view illustrating a pre-loader device according to another embodiment of the present invention.

The belt tightener of the pre-loader device is not needed when no passenger is seated therein or when a child is seated in the seat. Accordingly, as illustrated in FIG. 3, solenoid 16 is provided on the bottom wall of horizontal part 1a of casing 1. Stopper spool 161 of solenoid 16 penetrates through the bottom wall of horizontal part 1a into the inner space is in contact with the front face of the flange of the mass body which is positioned in the home position before advancing.

Spool 161 penetrates through horizontal part 1a into the internal space being driven by the spring force of a coil spring 162 disposed at the back of the flange part of stopper spool 161. In this arrangement, when solenoid coil 163 is electrically energized, stopper spool 161 is pulled downwards in resistance to the spring force of coil spring 162 and retracts into the space in the bottom wall.

When this embodiment is put into actual use, it is so arranged that a passenger sitting in the vehicle is detected by a sensor, such as microswitch and pressure switch, embedded in the seat and the electric continuity to solenoid coil 163 is shut off when no passenger is detected. Also, it is so arranged that when a child is seated, a pre-loader device disabling switch is turned ON to shut off the electric continuity to solenoid coil 163. As a result, as stopper spool 161 penetrates through horizontal part 1a into the inner space and contacts the face of flange 21, the advance of mass body 2 is prevented even if inertial forces act on mass body 2 during sudden deceleration of the vehicle, disabling the pre-loader device.

Each of the above embodiments is so structured that the seat belt buckle is pulled in. However, it is also acceptable that the retractor of a shoulder belt or the anchor of a lap belt are pulled in.

In the second embodiment, it is also acceptable that a motor, for example, is used instead of solenoid 16.

Also in the second embodiment, it is acceptable that a photosensor, for example, is used for judging whether the passenger seated is an adult or a child and controlling the solenoid instead of the pre-loader device operation disabling switch.

In the above first and second embodiments, if the load is excessively large after the expansion of coil spring 6 caused by the deceleration of the vehicle due to, for example, a collision producing small damage to the vehicle or running on an extremely rough road, the passenger is bound by the seat belt so strongly as to cause too uncomfortable feelings of constraint on the chest and lap to continue driving. To counter this problem, by sufficiently reducing the load after the expansion of coil spring 6 caused by the deceleration of the vehicle due to, for example, a collision producing small damage to the vehicle or running on an extremely rough road, the binding force of the seat belt applied to the passenger (not illustrated) can be reduced to a sufficiently small level. As a result, too strong a feeling of constraint across the chest and lap of the passenger, which is quite uncomfortable and often makes continued driving quite difficult, is eliminated.

Figure 4:
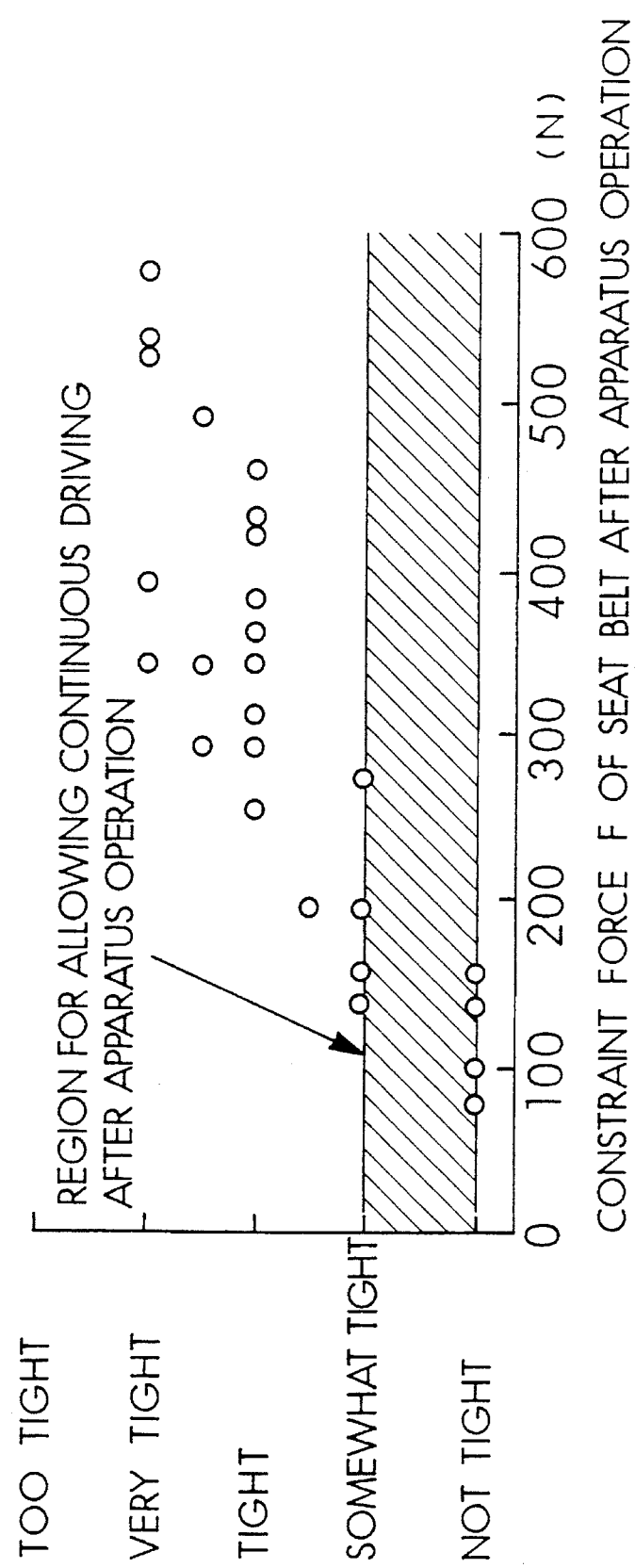
FIG. 4 is a graph illustrating the relation between the constraint force of a seat belt and the constraint feelings of a passenger.

The above will be described referring to the data shown in FIG. 4. The axis of the abscissa indicates the binding force of the seat belt after the pre-loader device is actuated, and the axis of the ordinate indicates the feeling of constraint experience by the passenger. As a result of evaluation through plotting in the graph, it was found that the feelings of constraint that did not interfere with continuous driving even after the actuation of the pre-loader device was within a range of "somewhat tight" or "not tight" and the load for actuating the pre-loader device at this time was about 200 N (newton). That is, the load for actuating the pre-loader device that allows continued driving even after the pre-loader device is actuated is about 200 N or less.

By setting the load of coil spring 6 in the above way, driving can be continued even after the pre-loader device is actuated due to, for example, a collision producing little damage to the vehicle or running on an extremely rough road.

As described above, the pre-loader device according to the present invention can quickly operate at a sudden deceleration of the vehicle to effectively protect the passenger. Furthermore, the operation or non-operation of the pre-loader device can be selected according to the situation.

Now, referring to FIGS. 5 through 7, description will be given to other embodiments which indicate release structure for detaching a seat belt from a seat belt buckle.

Figure 5:
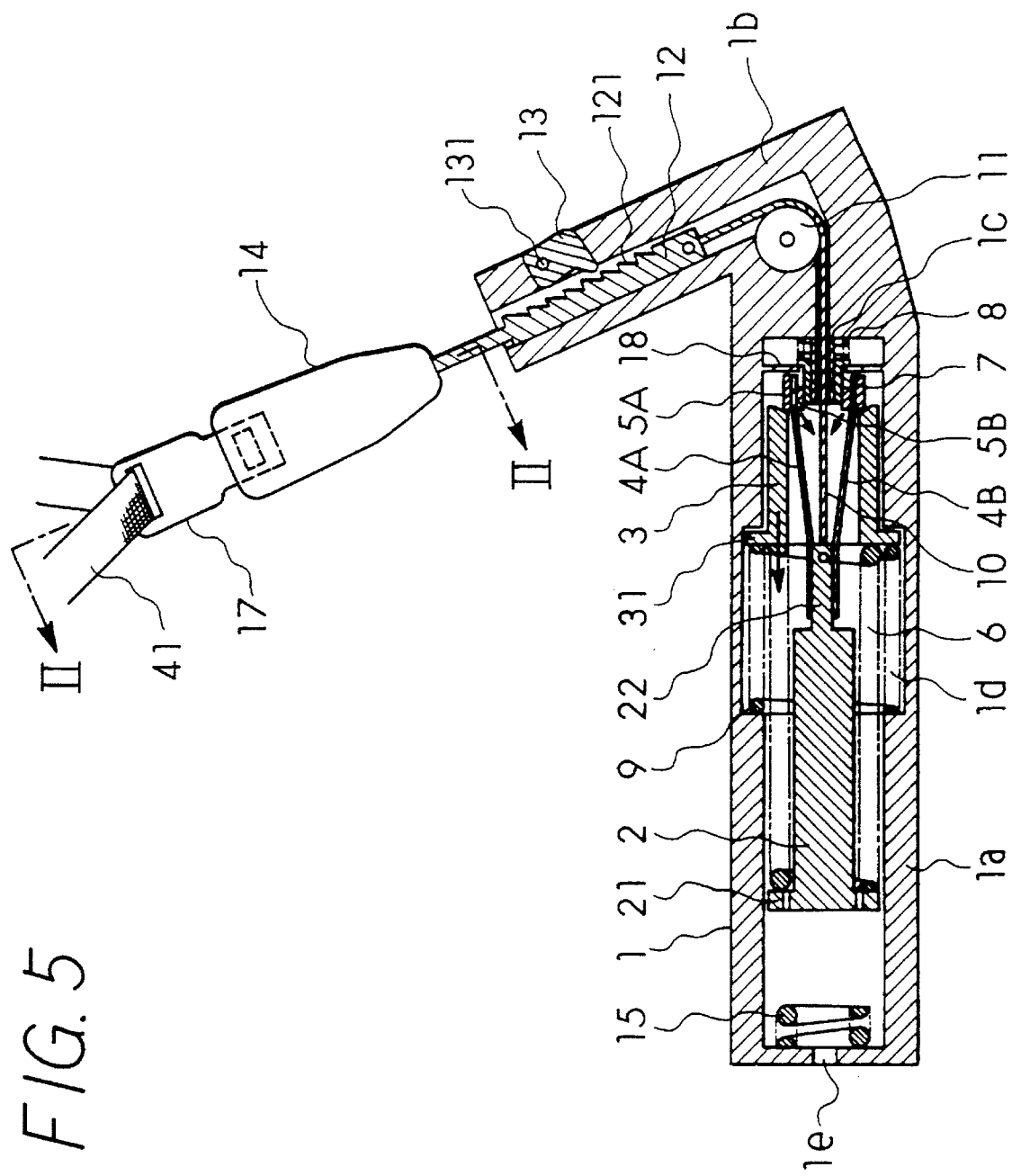
FIG. 5 is a cross-sectional view illustrating the pre-loader device provided with a seat belt buckle according to the present invention.

As the belt tightening part and the non-return part within casing 1 illustrated in FIG. 5 are the same in structure as those of the first embodiment illustrated in FIG. 1, the same numerals as those of the first embodiment will be allocated to the common components and the description thereof will be omitted.

In FIG. 5, casing 1 of a pre-loader device is provided, in the longitudinal direction of the vehicle (sideways in FIG. 1), and seat belt buckle casing 14a which is inclined upwards is provided on the extended line from the rear end of the casing 1. Both casings 1 and 14a fixed to the vehicle body by stays, (not illustrated), respectively.

Into the upper end part of seat belt buckle casing 14a is inserted the tip of tongue plate 17 attached to the folding part of seat belt 41.

Figure 6:
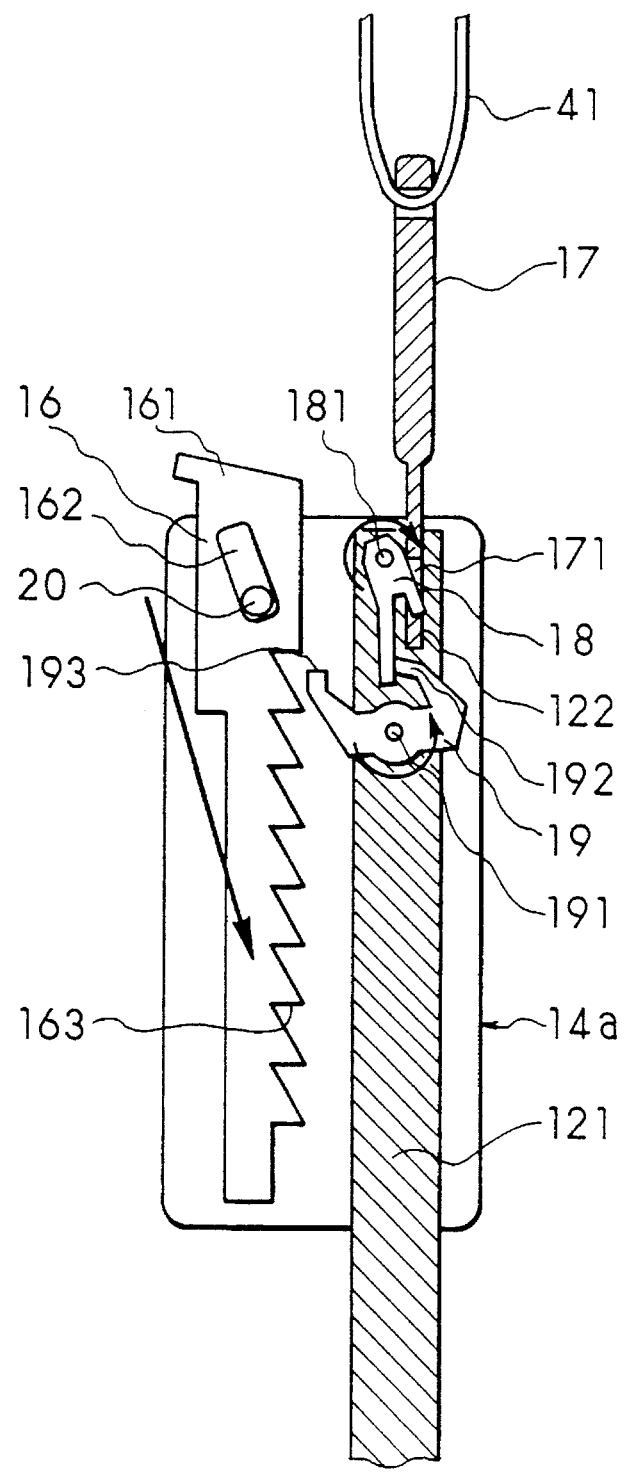
FIG. 6 is a cross-sectional view taken along line II—II of FIG. 5 illustrating the inside structure of the seat belt buckle according to an embodiment of the present invention.

Seat belt buckle 14 is illustrated in FIG. 6 in detail. Upper end part 121 of non-return rod 12 enters casing 14a from the lower side thereof and is linearly movably positioned within casing 14a. On the tip end thereof is formed oblong recessed part 122. The tip end part of tongue plate 17 is inserted into oblong recessed part 122. Locking hole 171 is formed at the tip end part of tongue plate 17. One of the forked protrusions of locking lever 18 enters locking hole 171 so as to lock tongue plate 17 therein. Locking lever 18 is pivotally supported at the base part by pin 181 on non-return rod 12. Locking lever 18 is rotatably energized by a spring (not illustrated) counterclockwise in FIG. 6, which depicts one of the forked protrusions thereof being locked in locking hole 171 of tongue plate 17.

The other forked protrusion of locking lever 18 contacts end 192 of unlocking lever 19. Unlocking lever 19 is pivotally supported at the central part of upper end part 121 by pin 191 on non-return rod 12.

Within casing 14a is provided unlocking rod 16 roughly parallel to non-return rod 12. The upper end of unlocking rod 16 includes operation button 161 protruding from the top of casing 14a. In unlocking rod 16, inclined slot 162 is formed at an upper end part thereof. Slot 162 is engaged with guide pin 20 protruding from the inner wall of casing 14a. Unlocking rod 16 is pressed upwards by a spring (not illustrated), so that when operation button 161 is pressed, unlocking rod 16 diagonally lowers as indicated by the arrow under the guidance of guide pin 20.

On a side face of unlocking rod 16, a plurality of sawtooth-like ratchet teeth 163 are formed in a longitudinal direction. When unlocking rod 16 is diagonally lowered by pressing operation button 161, one of ratchet teeth 163 catches second end 193 of unlocking lever 19. This turns unlocking lever 19 counterclockwise as indicated by the arrow. Following turning of unlocking lever 19, the locking lever 18 is turned clockwise as indicated by the arrow. As a result, the engagement of locking lever 18 with locking hole 171 is released.

When leaving the vehicle, the passenger presses operation button 161 of unlocking rod 16 disposed within seat belt buckle casing 14a. Then, unlocking rod 16 diagonally lowers as described above. Unlocking rod 16 has a plurality of ratchet teeth 163 on one side face thereof. Therefore, even if unlocking lever 19 has lowered together with non-return rod 12, one of ratchet teeth 163 of unlocking rod 16 securely engages with unlocking lever 19, turning the same. This disengages the protrusion of locking lever 18 from locking hole 171 of tongue plate 17, and as a result, the engagement is released.

As described above, even when the pre-loader device is actuated and the seat belt is tightened, operation button 161 of unlocking rod 16 remains in the same positions. Therefore, the passenger can quickly release seat belt 41 by pressing operation button 161 and leave the vehicle.

Figure 7:
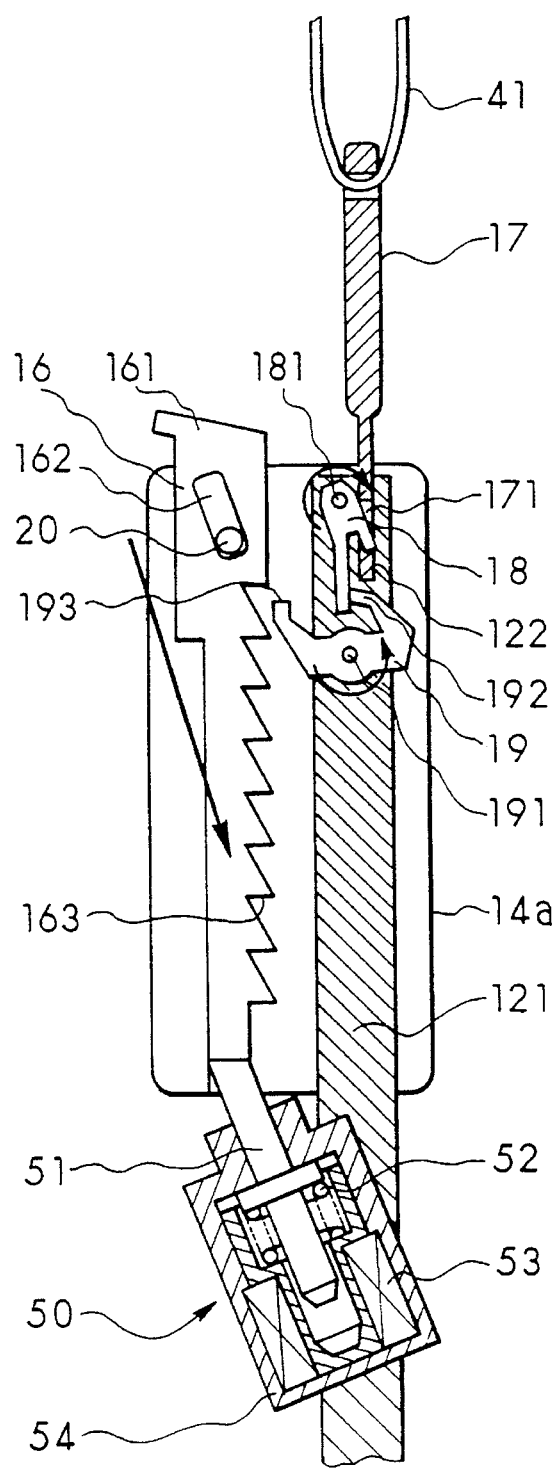
FIG. 7 is a cross-sectional view illustrating the inside structure of a seat belt buckle according to another embodiment of the present invention.

As illustrated in FIG. 7, electromagnetic actuator 50 is fixed to casing 14a. Plunger 51 disposed in the center of actuator casing 54 is inclined with respect to the lower end of unlocking rod 16 and is connected thereto. Plunger 51 is positioned parallel to slot 162 of unlocking rod 16. The rear side of plunger 51 is pressed by spring 52 in the protruding direction in the figure. Solenoid coil 53 provided within actuator casing 54 is connected to a buckle release switch provided on an instrument panel (not illustrated), and electrically energized by pressing the buckle release button.

In this arrangement, when the passenger presses the buckle release switch to leave the vehicle, plunger 51 is attracted to solenoid coil 53 and retracts. Then, unlocking rod 16 diagonally lowers as indicated by the arrow, and catches unlocking lever 19, turning the same. As a result, the engagement of locking lever 18 with tongue plate 17 is released.

In this embodiment, it is also acceptable that unlocking rod 16 be operated only by electromagnetic actuator 50 without providing operation button 161 protruding from the top of casing 14a. In this case, even if it is so designed that casing 14a is not fixed to the vehicle body and the seat belt is pulled in by a pre-loader device, as the buckle release button is in the fixed position, the same effect as that of the above third embodiment can be obtained.

Here, the installation of the buckle release switch is not limited to the instrument panel, but may be applied to the steering wheel, the center console, the door, etc., for example.

It is acceptable, instead of providing a buckle release switch, that the electromagnetic actuator is actuated by detecting a passenger's movement for leaving the vehicle using a photosensor, for example. It is also acceptable that the actuator is actuated after the preset period of time from the detection of a passenger's movement according to a sudden deceleration of the vehicle.

A motor, for example, may be used instead of the electromagnetic actuator, or a mechanical actuator connected to the buckle release switch with a wire, for example, may be used instead of an electric actuator.

In the above third and fourth embodiments, the unlocking member is composed of unlocking rod 16 and unlocking lever 19. However, unlocking rod 16 and unlocking lever 19 may be formed into an integral lever, for example.

As described above, according to the present invention, even when the seat belt is tightened by the pre-loader device, the position of the operating means for operating the unlocking member remains unchanged. Therefore, the passenger can quickly take off the seat belt and leave the vehicle.

Next, with reference to FIGS. 8 through 11, another embodiment including a reset structure for enabling the device to be reused once it has been used is described.

As the components, such as the pull-in mechanism part except for the reset mechanism part are the same in structure as that of the first or third embodiment, the same numerals as those of the first or third embodiment will be allocated to those common components, and the detailed description thereof will be omitted.

Reset wire 41 is branched from wire 10 in the vicinity of pulley 11. Reset wire 41 loops over pulley 19 disposed on the bottom at the rear end of casing 1 and reaches reset mechanism 40 disposed in front of casing 1. Reset mechanism 40 has non-return wheel 43 and reset wheel 42, both of which are integrally rotatably supported by support shaft 431. On the outer periphery of reset wheel 42 is fixed the tip end of reset wire 41.

Figure 9:
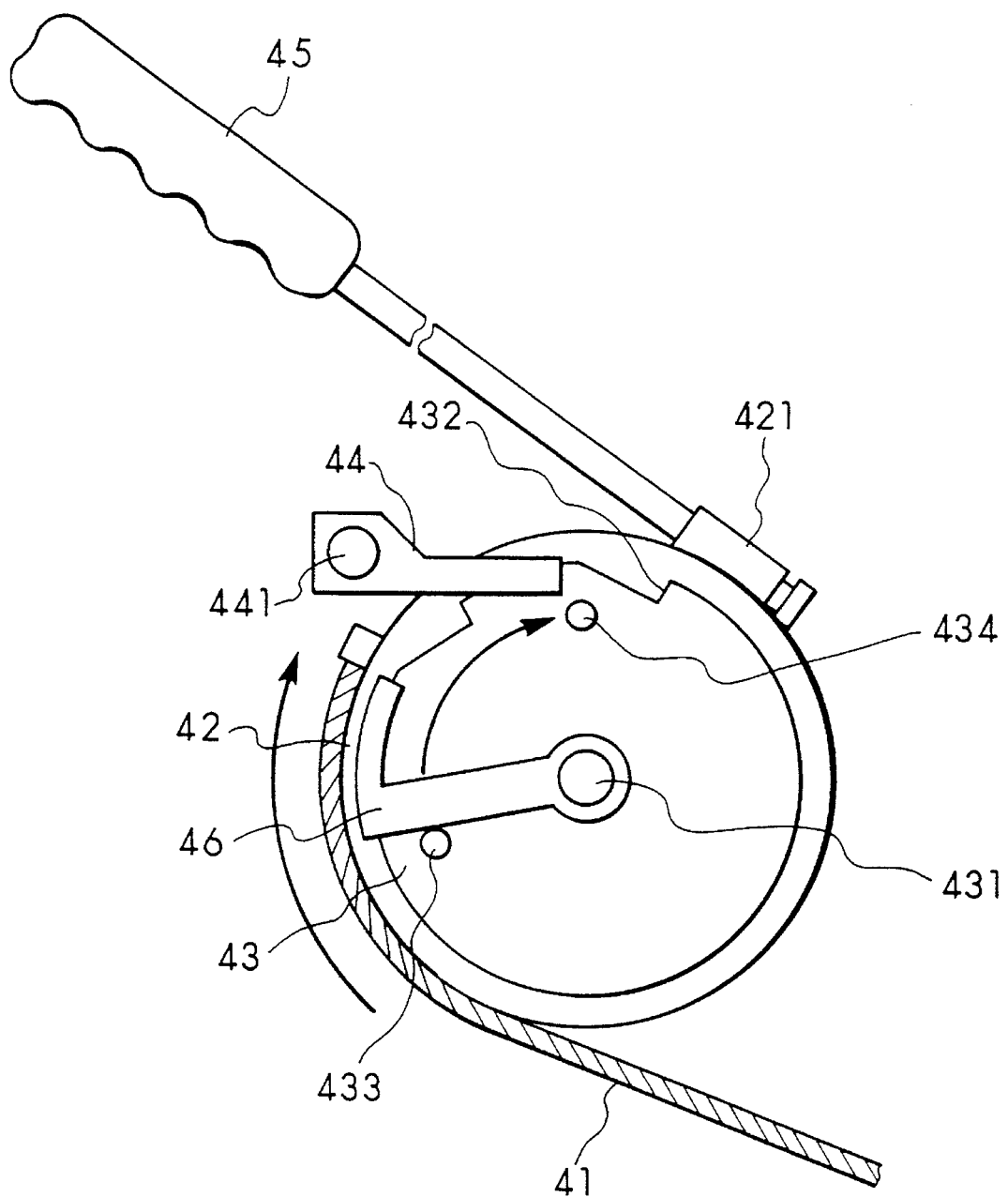
FIG. 9 is an enlarged cross-sectional view illustrating a reset mechanism.

The reset mechanism is illustrated in FIG. 9 in detail. In this figure, on a part of the outer periphery of reset wheel 42 is formed lever holding part 421, to which the base end of reset lever 45 is fixed. Non-return wheel 43 is provided with a plurality of sawtooth-like ratchet teeth 432 for almost 180° around the periphery thereof. The tip end of locking pawl 44 engages with one of ratchet teeth 432 to prevent non-return wheel 43 (i.e., the reset wheel 42) from reverse (counterclockwise) rotation. Locking pawl 44 is pivotally supported at the base end by a support shaft 441 provided on the vehicle body.

Locking pawl release lever 46 is pivotally provided on support shaft 431. Locking pawl release lever 46 radially extends from support shaft 431 to the proximity of the outer periphery of reset wheel 42, and then bends in roughly an L-shape along the outer periphery of reset wheel 42 and extends therefrom for a certain length forming an arc.

Locking pawl release lever 46 is in contact with pin 433, disposed on the plate surface of non-return wheel 43, on the lower side face. When reset wheel 42 (and the non-return wheel 43) is turned clockwise by reset lever 45 as indicated by the arrow, locking pawl release lever 46 is roundly thrust upwards by pin 433.

Here, pin 434 is provided on the plate surface of non-return wheel 43 in a position apart from pin 433 at a specified angle.

Figure 8:
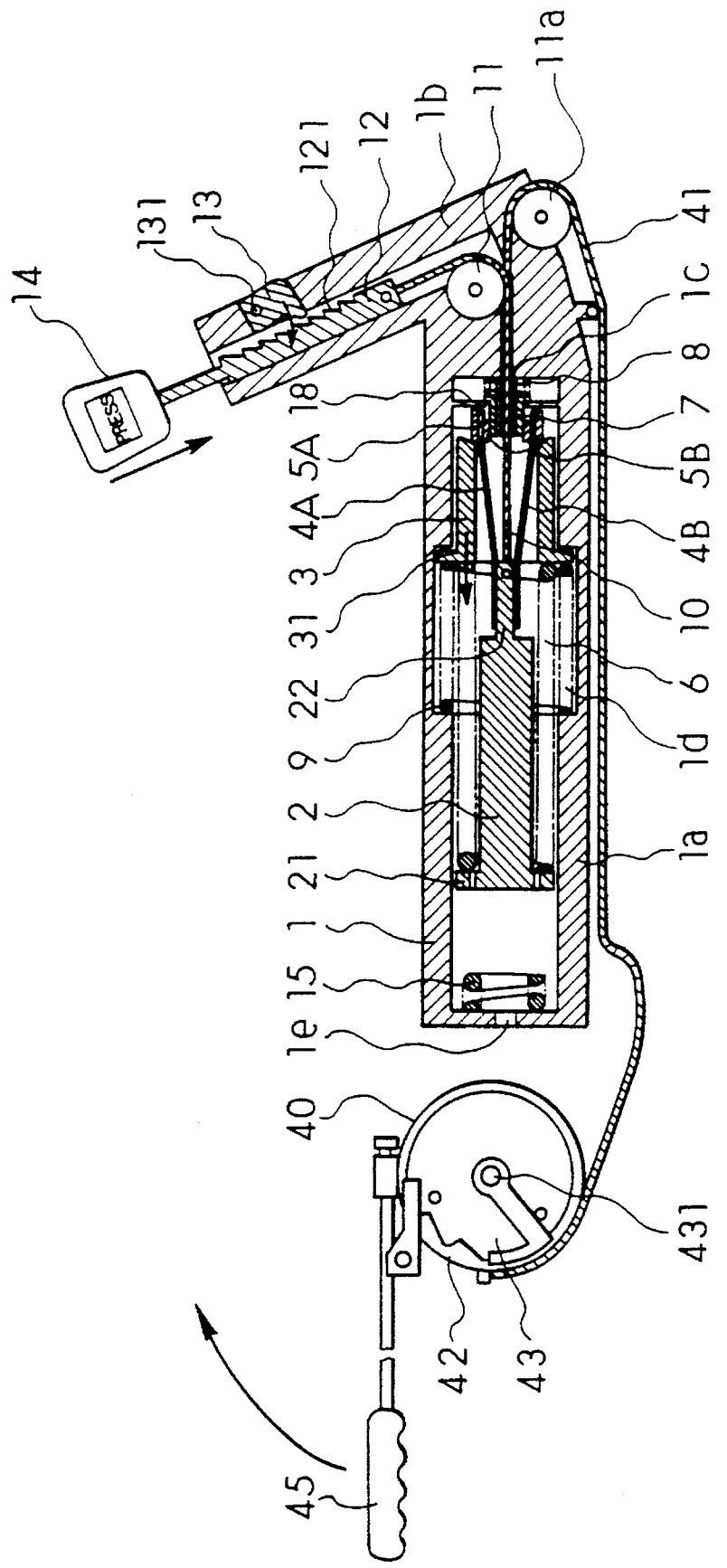
FIG. 8 is an overall longitudinal cross-sectional view illustrating a pre-loader device according to another embodiment of the present invention.

In the initial state of the pre-loader device, reset lever 45 is horizontally positioned and wire 41 has the specified slackness as illustrated in FIG. 8. Pulley 11a maintains the slack in wire 41. When the vehicle makes a sudden stop or runs on a rough road in this state, the deceleration increases. Then, locking pawl 44 swivels in the direction indicated by the arrow in FIG. 10 due to the inertial force at a stage when the deceleration is still very small. As a result, the locking pawl 44 contacts one of the ratchet teeth 432 of the non-return wheel 43.

When the deceleration starts increasing in this state, as the spring force of coil spring 9 is set to be weak, the inertial force acting on mass body 2 and holder 3 exceeds the spring force of coil spring 9 at a stage when the deceleration is relatively small. Then, coil spring 9 is compressed and deformed, and mass body 2 and holder 3 start advancing. Accordingly, the rear end of holder 3 separates from the tip end of retainer 7, the gap therebetween becomes wider, and inside stoppers 5B detach from the outer periphery of retainer 7.

As a result, outside stoppers 5A can move inwards in the direction indicated by the arrow in FIG. 1 along the tapered face of the rear end of holder 3. As a strong expanding spring force of coil spring 6 acts on outside stoppers 5A through mass body 2, outside stoppers 5A enter into the cylindrical space of holder 3 in resistance to the spring forces of plate springs 4A and 4B. As a result of the release of the holding by stoppers 5A and 5B, mass body 2 is quickly pushed forwards by the expansion of coil spring 6 and advances until mass body 2 contacts coil spring 15.

Following the advancement of mass body 2, wire 10 connected to the mass body is pulled. Then, the non-return rod 12 and seat belt buckle 14 fixed integrally thereto are pulled in downwards. As a result of the pull-in movement of seat belt buckle 14, the seat belt connected thereto with a tongue plate (not illustrated) is tensioned and the slackness thereof is eliminated.

As mass body 2 is quickly thrust by the spring force of coil spring 6, the slackness of the seat belt is quickly eliminated. The elimination of the slackness is completed before the passenger subjected to the deceleration starts advancement and before the load of the passenger is applied to the seat belt. Therefore, although the spring force of coil spring 6 is relatively small, the slackness of the seat belt can be completely eliminated.

While non-return rod 12 is lowered, locking pawl 13 slides over the inclined face of respective ratchet teeth 121. When the load of the passenger is applied to the seat belt, however, locking pawl 13 engages with the vertical face of one of ratchet teeth 121 to prevent the non-return rod 12 from returning upwards. Accordingly, the passenger is protected by the tightened seat belt from the danger of being ejected to the front or towards the vehicle's windshield.

To reset the pre-loader device which has been actuated as described above, reset lever 45 is roundly lifted from the state illustrated in FIG. 8 to that illustrated in FIG. 9. Then, reset wheel 42 and the non-return wheel 43 turn clockwise, and reset wire 41 is reeled. Along with the reeling, mass body 2 retreats in resistance to the expanding spring force of coil spring 6 and compressively deforms coil spring 6.

As a result of the retreat of mass body 2, inside stoppers 5B disposed at the tip end of plate springs 4A and 4B contact retainer 7 and cause retainer 7 to retreat in resistance to the spring force of coil spring 8. After outside stoppers 5A come out of the cylindrical space of holder 3, outside stoppers 5A and inside stoppers 5B are moved outwards by the spring force of plate springs 4A and 4B and held between the outer periphery of retainer 7 advanced again by the spring force and the rear end face of holder 3. This completes the reset of the device to the initial state illustrated in FIG. 8.

Figure 10:
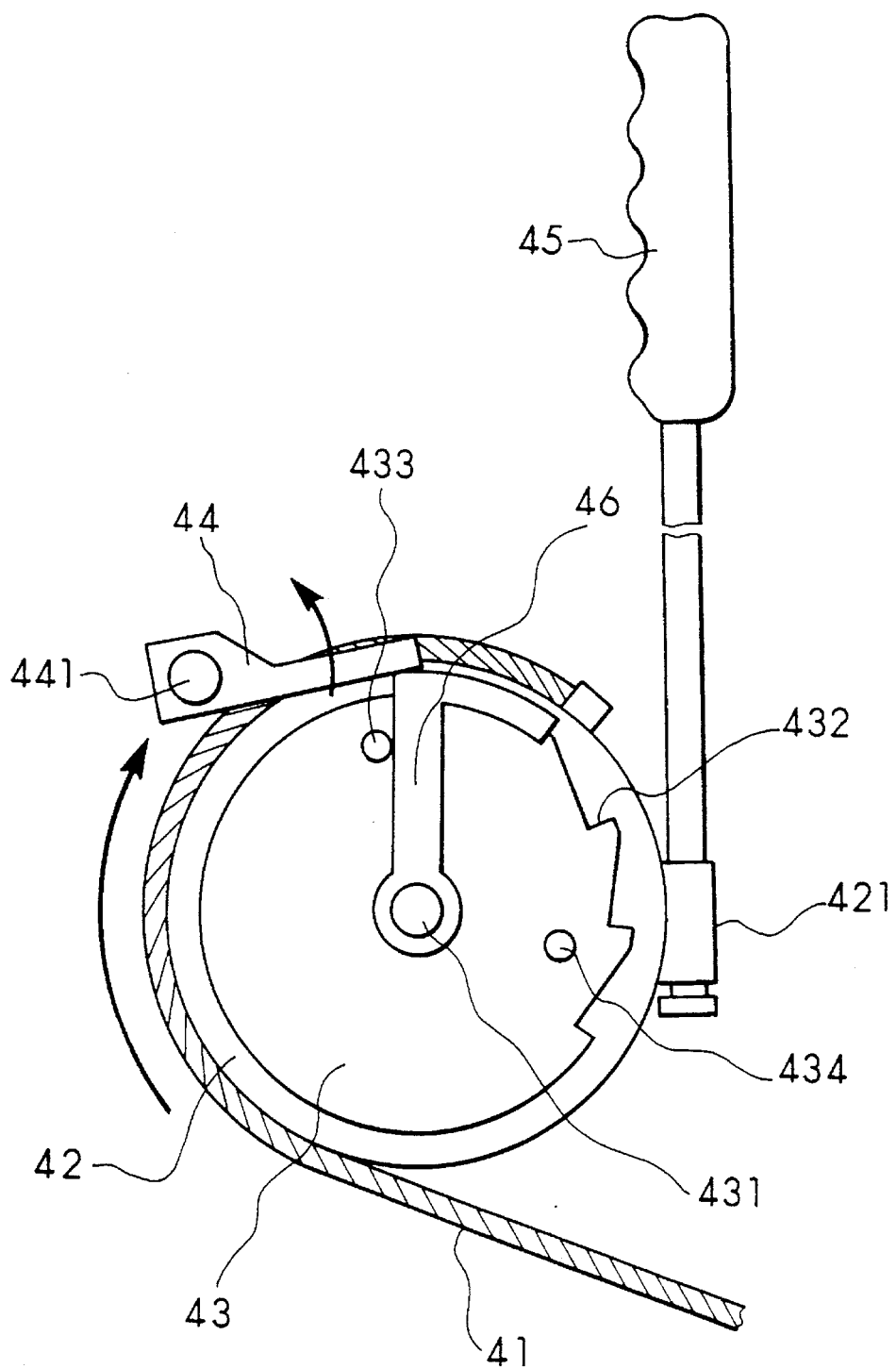
FIG. 10 is an enlarged cross-sectional view illustrating the operational condition of the reset mechanism.

During the above resetting operation, reset lever 45 is raised to the vertical position illustrated in FIG. 10. In this roundly raising process of reset lever 45, locking pawl release lever 46 is pushed by pin 433 and roundly turns upwards and then pushes locking pawl 44 upwards with the arc-shaped tip end part thereof (in the direction indicated by an arrow in the figure). As a result, locking pawl 44 is disengaged from ratchet teeth 432, whereby reset wheel 42 is ready for reverse turning. In this state, when reset lever 45 is returned to the horizontal position illustrated in FIG. 8, locking pawl 44 does not engage with any of ratchet teeth 432 of non-return wheel 43 during this returning period.

Then, immediately before reset lever 45 returns to the horizontal position, pin 434 on non-return wheel 43 contacts locking pawl release lever 46 in the vertical position and causes locking pawl release lever 46 to turn under its own weight to the lower position where locking pawl release lever 46 contacts pin 433.

Now, the pre-loader device is ready for operation again from the state illustrated in FIG. 8.

In inspecting or adjusting a pre-loader device, by erroneously touching components, stoppers 5A and 5B held between retainer 7 and holder 3 may be displaced, and coil spring 6 may expand and then mass body 2 may advance, whereby the pre-loader device may be actuated.

Figure 11:
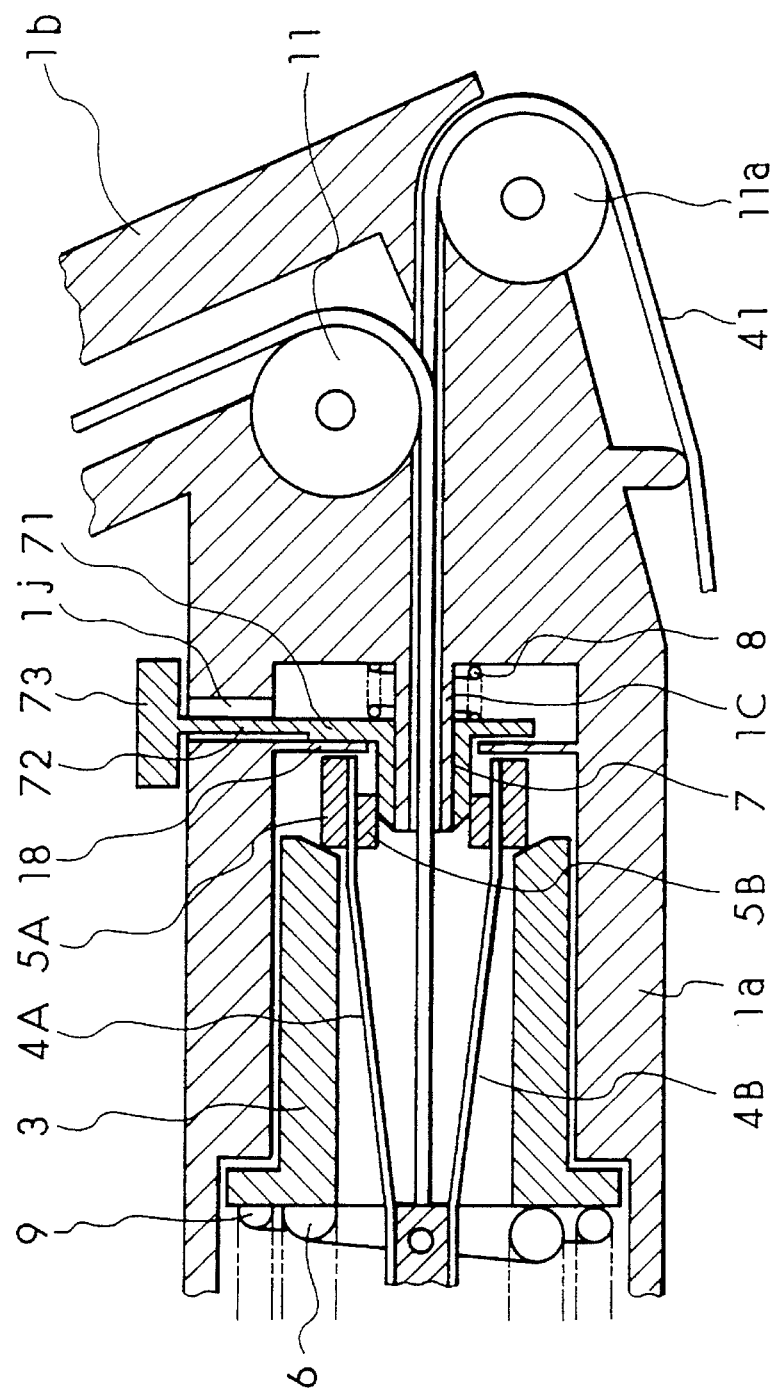
FIG. 11 is an enlarged cross-sectional view illustrating the main part at the rear end of the horizontal part of a casing according to another embodiment of the present invention.
Figure 12:
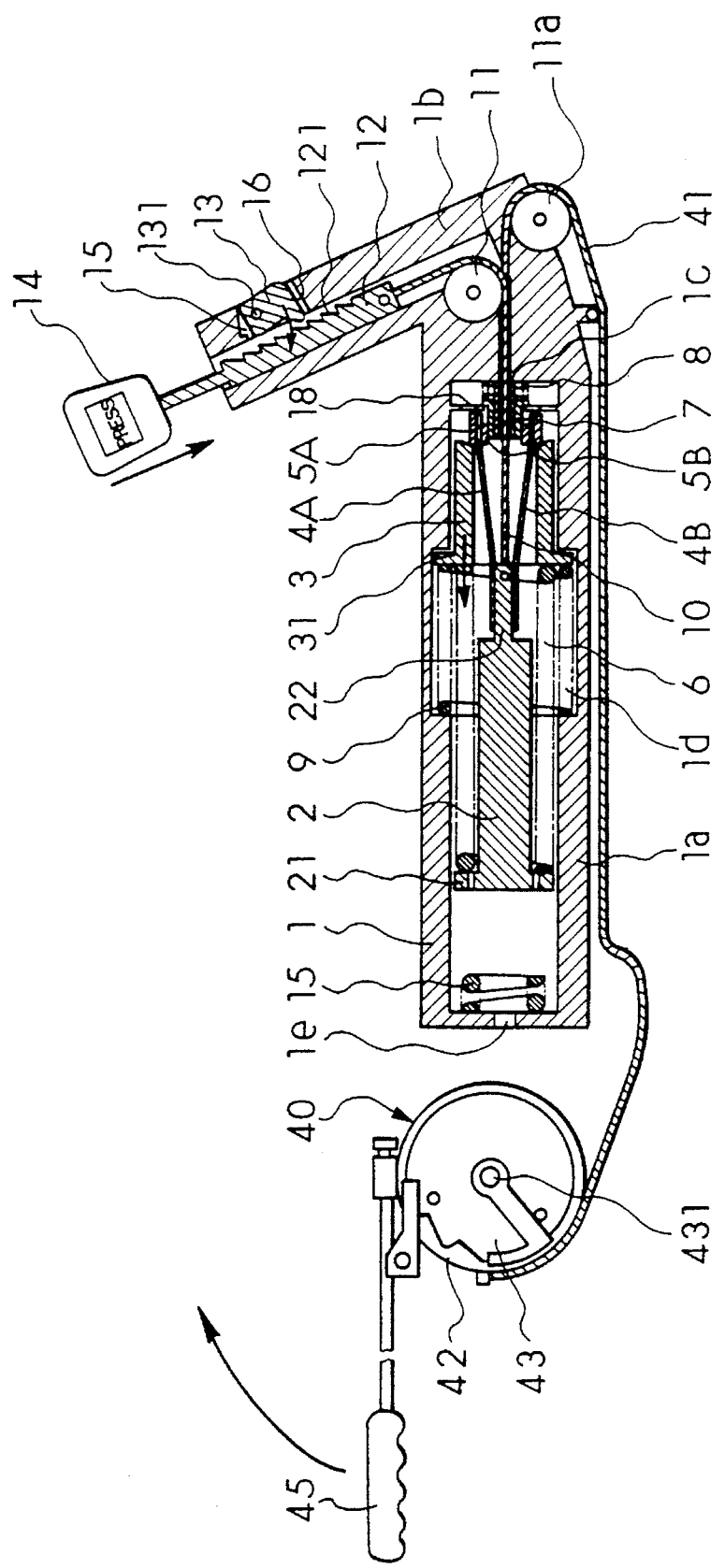
FIG. 12 is an overall longitudinal cross-sectional view illustrating the pre-loader device according to another embodiment of the present invention.

To solve this problem, as illustrated in FIG. 11, arm part 72 extends upwards from flange part 71 of retainer 7 and passes through hole 1j formed in the upper wall of horizontal part 1a of casing 1. The tip end thereof is formed to be operation handle 73 including a release operation member.

When maintenance or inspection of the pre-loader device is needed, operation handle 73 is shifted to the right as viewed in the figure in resistance to the spring force of coil spring 8. As a result, inside stoppers 5B at the tip of plate springs 4A and 4B are detached from the outer periphery of retainer 7 and ready for inward movement. At the same time, outside stoppers 5A are detached from the rear end face of holder 3, whereby coil spring 6 is expansionally deformed, mass body 2 advances, and then the pre-loader device is actuated.

In this way, as coil spring 6 is expanded to shift mass body 2 to the front pull-in position before an inspection, accidental actuation of the pre-loader device due to the expansion of coil spring 6 caused by erroneous touching of components during inspection can be prevented.

In the above embodiments, it is so designed that the seat belt buckle is pulled in. However, it is also acceptable that a retractor of a shoulder belt or an anchor of a lap belt is pulled in.

The structure for holding the coil spring of the pre-loader device is not limited to that described in the above embodiments and a structure using a lever, for example, is also acceptable.

In addition, a pedal, for example, may be used instead of the reset wheel and the reset lever.

As described above, the pre-loader device according to the present invention can easily be indefinitely reused by resetting the same and thereby effectively protect the passenger even if the vehicle makes a sudden stop or runs on a rough road. Furthermore, accidental actuation of the device can be prevented.

Next, another embodiment of the non-return mechanism will be described referring to FIGS. 12 through 16. Here, in the same way as above, as the structure of the pull-in operation part and the structure of the reset mechanism are the same as those of the fifth embodiment, the same numerals as those of the fifth embodiment will be allocated to common components, and the detailed description thereof will be omitted.

Figure 13:
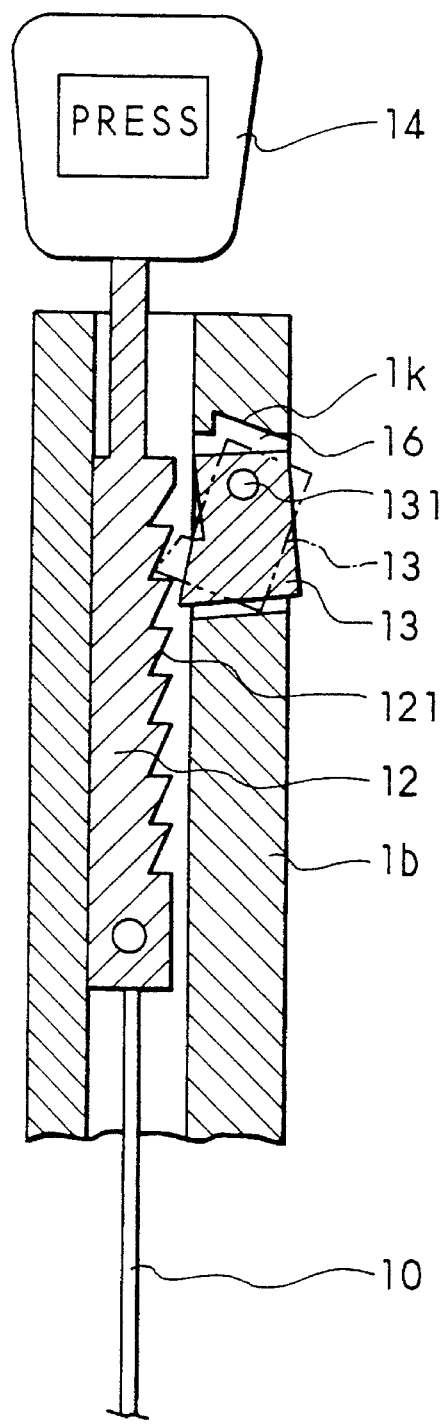
FIG. 13 is an enlarged cross-sectional front view illustrating the main part of a locking pawl-provided part.

In FIG. 13, non-return rod 12 is longitudinally movably provided within the inner space of inclined part 1b. On one side of non-return rod 12 are formed a plurality of sawtooth-like ratchet teeth 121. Seat belt buckle 14 is fixed to non-return rod 12 as an upper end thereof. Opening 16 is formed in the side wall of inclined part 1b facing ratchet teeth 121. In opening 16, locking pawl 13 for preventing the regression of non-return rod 12 with the upper end part pivotally supported by swivel pin 131 is disposed. When the inertial force toward the front of the vehicle is not acting thereon, locking pawl 13 is positioned in opening 16 in the backward swivel end position and disengaged from non-return rod 12 as illustrated in the FIG. 13.

Figure 14:
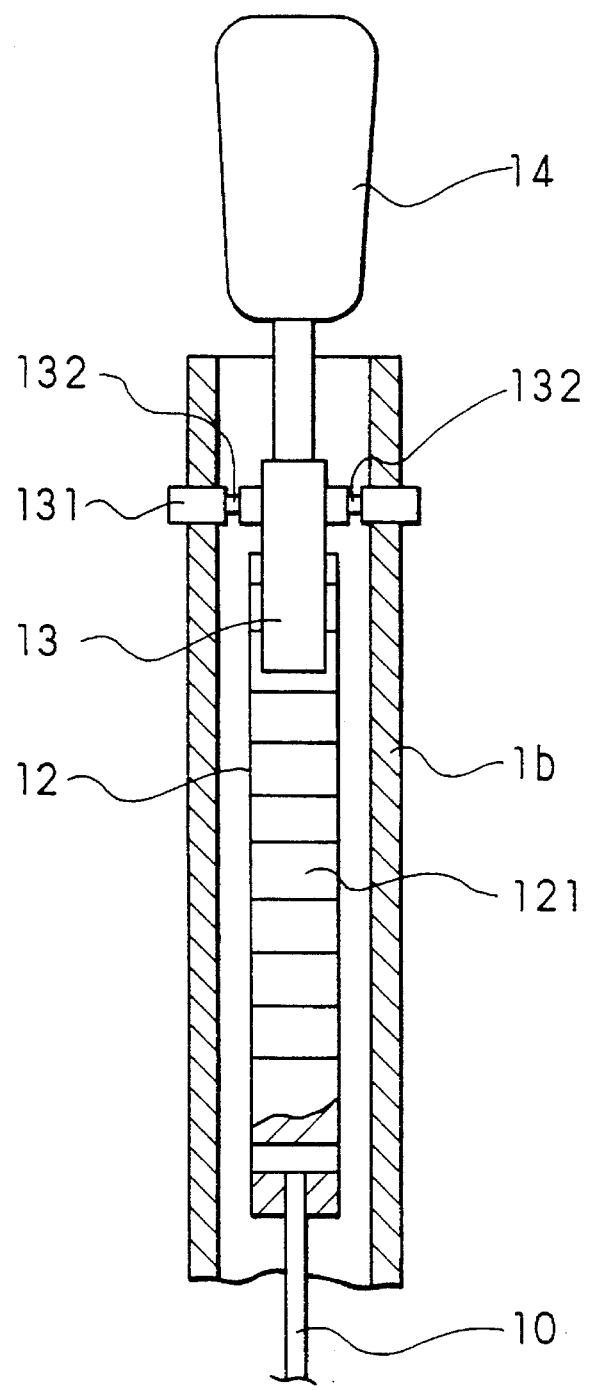
FIG. 14 is an enlarged cross-sectional side view illustrating the main part of the locking pawl-provided part.

The details of locking pawl 13 and its connection to inclined part 1b are shown in FIG. 14. Locking pawl 13 is positioned within opening 16 formed in the side wall of inclined part 1b. When the vehicle starts deceleration and the inertial force develops, locking pawl 13 swivels forwards (to the position indicated by a dot-dash line in FIG. 13), and the tip end thereof engages with one of ratchet teeth 121 of non-return rod 12. As a result, the seat belt can be prevented from being further fed out by the load of the passenger.

Opening 16 is shaped roughly to conform to the shape of the side face of locking pawl 13 positioned in the backward swivel end position. Furthermore, a part of the upper wall of opening 16 has a recessed part 1k having a roughly triangular cross section to fit with the top part of locking pawl 13 in the forward swivel end position.

As illustrated in FIG. 14, on swivel pin 131 of locking pawl 13 are formed small diameter parts 132 to the right and left of locking pawl 13 respectively. Small diameter parts 132 are more vulnerable to the load of the passenger and are deformed easier as compared with other parts.

Locking pawl 13 engages with one of ratchet teeth 121 of the non-return rod 12 to prevent the return of the seat belt. When the deceleration of the vehicle is large, however, such a large load from the passenger may be applied to locking pawl 13 as to excessively elongate the seat belt. Using such an elongated seat belt is not desirable in view of the protection of the passenger.

Figure 15:
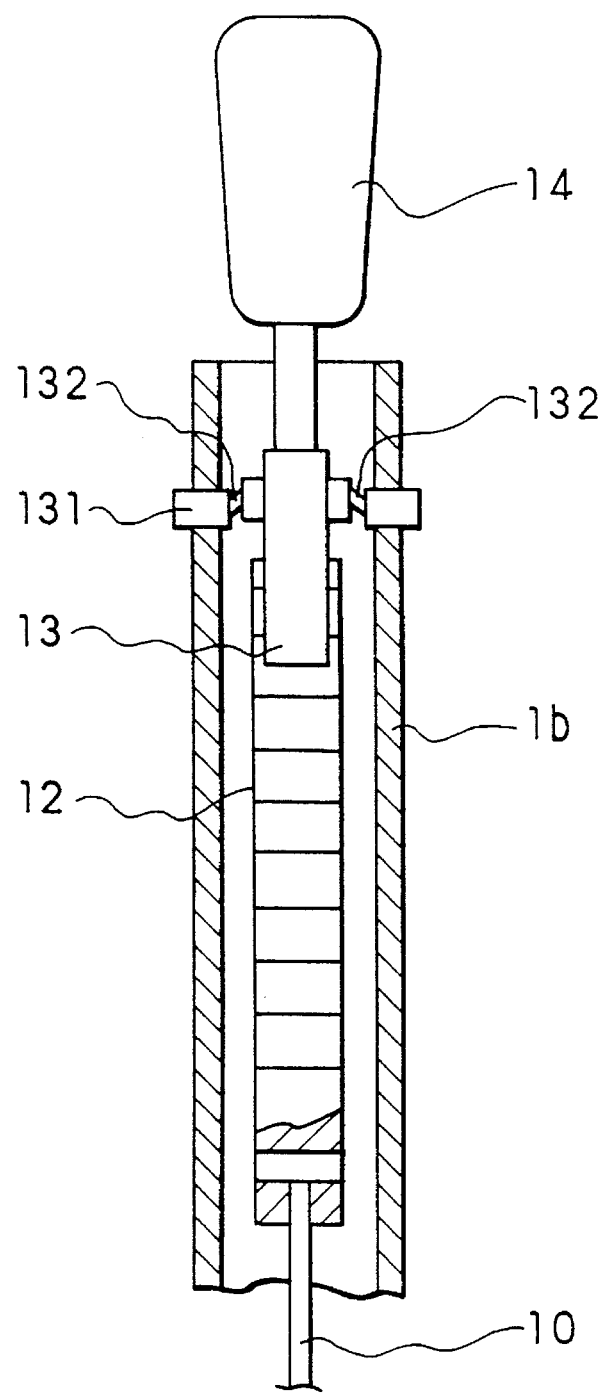
FIG. 15 is an enlarged cross-sectional side view illustrating the main part of the locking pawl-provided part with the deformed swivel shaft.
Figure 16:
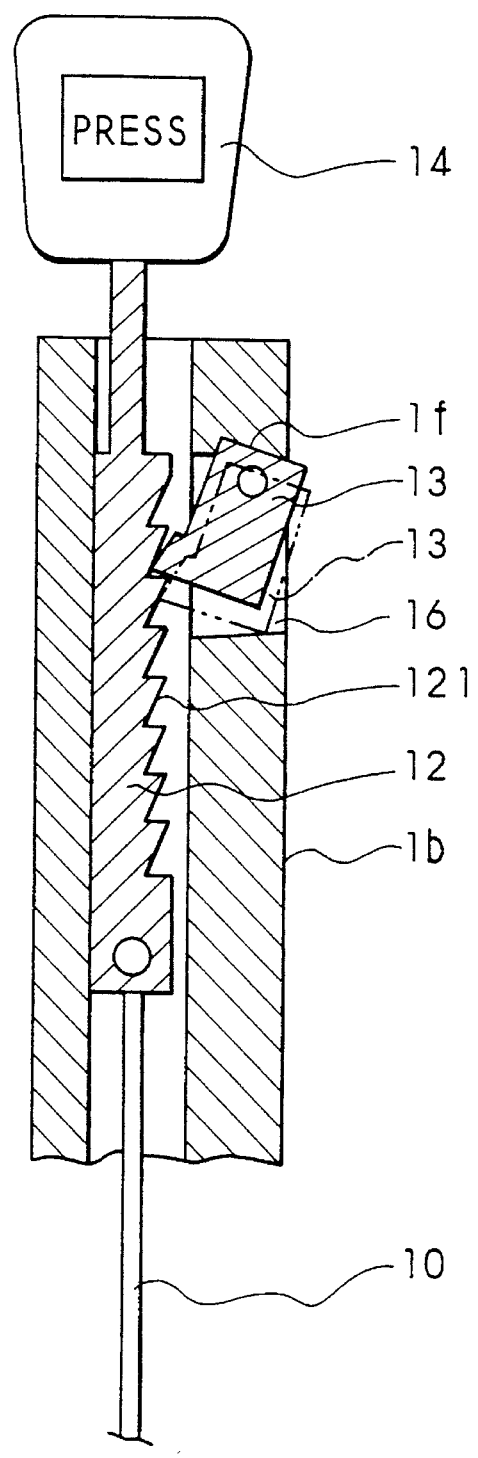
FIG. 16 is an enlarged cross-sectional front view illustrating the main part of the locking pawl-provided part with the deformed swivel pin.

If the excessive load of the passenger is applied to locking pawl 13 through the engagement with ratchet 121, vulnerable small diameter parts 132 are deformed as illustrated in FIG. 15, and entire locking pawl 13 moves upwards, and the top part of locking pawl 13 fits within recessed part 1k of opening 16 (from the state indicated by a dot-dash line to that indicated by a full line in FIG. 16). In this state, as locking pawl 13 is disabled to swivel back into opening 16, either upward and downward movement of non-return rod 12 is restrained by locking pawl 13 staying in the protruded position.

As a result, even if reset lever 45 is raised to return mass body 2 to the home position thereof, mass body 2 will not move, and therefore, the pre-loader device can not be reused. This prevents the passenger from reusing the excessively elongated seat belt unknowingly.

In the above embodiment, the vulnerable part is assigned to small diameter parts 132 of swivel pin 131 of locking pawl 13. However, the vulnerable part may be changed appropriately according to the specific structure of the non-return member.

As described above, the pre-loader device according to the present invention can easily be indefinitely reused by resetting the same. In addition, as the pre-loader device can not be reused after a sudden stop of the vehicle to such an extent that excessively elongates the seat belt, the passenger can be completely protected.

This invention has been described in connection with what are currently considered to be the most practical and preferred embodiments of the present invention. However, this invention is not to be limited to the disclosed embodiments, but rather is intended to cover various modifications and alternative arrangements included within the spirit and scope of the appended claims.

What is claimed is:

1. A belt tightener for a seat belt, wherein said belt tightener pulls in a seat belt when deceleration of a moving vehicle exceeds a predetermined value, comprising:

a casing extending in the longitudinal direction of the vehicle;

a compression spring having a first end and a second end and disposed in said casing;

a connecting member having a first end and a second end, with a buckle of the seat belt connected to said first end of said connecting member;

a supporting member supporting said first end of said compression spring;

a pull-in member contacting said second end of said compression spring, connected to said second end of said connecting member and adapted to move in an expansion direction of said compression spring following expansion of said compression spring;

wherein said pull-in member includes a locking part engageable with and disengageable from said supporting member to maintain said compression spring in a compressed state by causing said locking part to be engaged with said supporting member; and a restricting member contacting said locking part for restricting movement thereof in the direction in which the engagement of said locking part is released;

wherein said seat belt is tightened by the expansion of said spring caused by the release of contact between said locking part and said restricting member and disengagement of said locking part from at least a portion of said supporting member when deceleration of the vehicle exceeds the predetermined value.

2. The belt tightener for a seat belt according to claim 1, wherein said pull-in member includes a means for re-engagement movable in the direction of pull-out movement of said seat belt after said compression spring expands.

3. The belt tightener for a seat belt according to claim 1, wherein said supporting member includes means for moving in a direction in which a space formed between said supporting member and said restricting member, and smaller than said locking part, widens when deceleration of the vehicle exceeds the predetermined value.

4. The belt tightener for a seat belt according to claim 2, wherein said supporting member includes means for moving in a direction in which a space formed between said supporting member and said restricting member, and smaller than said locking part, widens when deceleration of the vehicle exceeds the predetermined value, and wherein said restricting member includes means for moving in a direction of movement of said locking part when said pull-in member moves in the direction of pull-out movement of said seat belt for re-engagement after said compression spring expands, thus forming said space larger than said locking part and said locking part re-engages with said supporting member to maintain said restricting member in the compressed state.

5. The belt tightener for a seat belt according to claim 1, wherein said locking part comprises:

a plate member connecting with said connecting member, which gradually expands in a radial direction of said compression spring, and a stopper provided at a tip end part of said plate member and contacting said supporting member and said restricting member facing said supporting member.

6. The belt tightener for a seat belt according to claim 5, wherein said compression spring and said pull-in member jointly form a mass body movable according to deceleration of the vehicle.

7. The belt tightener for a seat belt according to claim 6, wherein said stopper is longitudinally movable and provides stopping movement of said mass body by being engaged therewith.

8. A belt tightener for a seat belt disposed in a moving vehicle, said belt tightener comprising:

a casing having first and second hollow parts;

supporting means disposed in said first hollow part for moving in a longitudinal direction of said casing in response to a deceleration force of said moving vehicle;

means for supplying a force in a direction opposite to a direction of said deceleration force, said supplying means being connected to said seat belt, said supplying means disposed in said first hollow part, said supplying means including blocking means for blocking said supplying means in order to prevent said supplying means from supplying said force until said supporting means moves in said longitudinal direction by a predetermined distance which releases said supplying means, wherein said supporting means includes:

a movable cylindrical holder having a flange at a far end thereof; and a coil spring disposed so as to be in contact with said flange of said cylindrical holder.

9. A belt tightener for a seat belt according to claim 8, wherein said supplying means includes:

a mass body having a flange at a far end thereof; and a second coil spring maintained in a compressed state between said flange of said mass body and said flange of said cylindrical holder.

10. A belt tightener for a seat belt according to claim 9, wherein said blocking means includes a pair of plate springs connected to said mass body; and a locking part for holding said plate springs, said locking part being disposed so as to move between a first and a second position when said supplying means releases, said locking part being disposed at an end of said plate springs opposite said mass member.

* * * * *